United States Patent [19]

Schoon

[11] Patent Number: 4,571,623

[45] Date of Patent: Feb. 18, 1986

[54] DATA CLOCKING CIRCUITRY

[75] Inventor: David J. Schoon, North Branch, Minn.

[73] Assignee: Minnesota Mining and Manufacturing Company, St. Paul, Minn.

[21] Appl. No.: 574,066

[22] Filed: Jan. 26, 1984

[51] Int. Cl.[4] .............................................. H04N 3/08
[52] U.S. Cl. .................................... 358/208; 258/285; 250/234
[58] Field of Search ............... 358/208, 206, 199, 285, 358/293, 292, 294, 280; 250/234; 350/6.5, 6.6

[56] References Cited

U.S. PATENT DOCUMENTS

| | | | |
|---|---|---|---|
| 4,122,494 | 10/1978 | Levine | 358/208 |
| 4,268,867 | 5/1981 | Traino | 358/285 |
| 4,296,441 | 10/1981 | Ogasawara | 358/293 |
| 4,358,789 | 11/1982 | Confer | 358/208 X |
| 4,386,271 | 5/1983 | Chiang et al. | 358/208 X |

Primary Examiner—Howard W. Britton
Assistant Examiner—Victor R. Kostak
Attorney, Agent, or Firm—Donald M. Sell; James A. Smith; Robert L. Marben

[57] ABSTRACT

Data clocking circuitry providing data clocking signals usable to control the output of a laser directed to a self-resonant mirror of a scanning apparatus. The circuitry selects clock signals from the output of a stable clock in accordance with a program stored in a memory and with the output of a voltage controlled oscillator (VCO) used to provide the data clocking signals with the VCO provided with a control signal based on the difference in the accumulated count between the selected clock signals and data clocking signals.

4 Claims, 3 Drawing Figures

DATA CLOCKING CIRCUITRY

BACKGROUND OF THE INVENTION

The invention presented herein relates to clocking circuitry for providing data clocking signals for control of the output from a laser directed to a self-resonant mirror of a scanning apparatus wherein the rate of the data clocking signals is matched with a high degree of accuracy to the sinusoidal movement of the self-resonant mirror.

Laser printers produce latent electrostatic images on a photoconductor by directing light from a laser to the photoconductor that has received a uniform electrical charge. The light from the laser is directed to the photoconductor in a scanning fashion with the laser turned on and off according to image defining data signals. It is important that the laser be controlled for on or off operation at the same point in one scan line as in the preceding scan line. If this action is not precisely controlled, images will appear irregular and portions of an image intended to present vertical lines will not be exactly vertical. Arrangements are used wherein light from the laser is directed to a moving mirror which reflects the light from the laser to the photoconductor to establish a scan line. The photoconductor is adapted for movement transverse to the scan lines so the light is directed to a different portion of the photoconductor for each scan line. A self-resonant scanning mirror is a desirable device for providing a moving mirror for the scanning portion of a laser printer since its movement is highly reproducible from one line scan to the next due to its high "Q". The inherent stability of the self-resonant scanning mirror can be utilized in a scanning system for a laser printer provided line-to-line synchronization of data signals provided to the laser is done precisely.

While the movement provided for the mirror of a resonant scanning mirror is highly reproducible, the velocity of movement is sinusoidal, which requires the clocking of image defining data signals for operation of the laser to be carried out in a manner that adjusts for the sinusoidal velocity of the mirror so a desired spacing of the image areas is attained. Prior approaches for providing a solution to this problem include the use of a second light beam plus a ruling or grating to generate clock signals. This is a cumbersome and expensive approach. Another approach, which also fails to provide the accuracy desired, uses the tachometer output of the scanning mirror to regulate the rate of clocking. Such an approach requires a solution to the inherent electrical noise component and microphonic noise component that is present in the tachometer output. A further solution to the problem of providing data clock signals in a manner that adjusts for the varying velocity of a moving mirror has been found which uses a voltage controlled oscillator that is varied according to data stored in an addressable memory. The stored data is based in part on the known repetitive movement of the mirror. The output of the voltage controlled oscillator is applied to a counter for addressing the memory as well as providing clock signals to another memory containing image data to be applied for control of the laser output. Such solution falls short of providing the degree of adjustment of the data clock signals relative to the velocity of a moving mirror that is desired for a high quality non-impact printer.

SUMMARY OF THE INVENTION

The present invention provides a solution to the problem of providing data clocking signals for control of a laser to establish on-off operation of the laser at equally spaced or predetermined points along a scan line defined by a scanning apparatus using a self-resonant mirror to which the output of the laser is directed. The present invention is embodied in circuitry including a clock signal producing means for providing clock signals which are spaced by equal time intervals and selecting from such clock signals, clock signals that can be used for the production of data clock signals so that on-off operation of the laser will occur when the laser is directed via the self-resonant mirror to equally spaced or predetermined points along a scan line. A data clock signal producing means is provided for receiving the selected clock signals. The data clock signal producing means includes a voltage controlled oscillator (VCO) providing the data clocking signals with a control signal means providing control of the VCO controlled via a control signal based on the difference in accumulated count between the selected clock signals and the data clocking signals. The data clock signal producing means, which serves to provide data clocking signals, has improved spacing over the spacing established by the selected clock signals so more accurate and repeatable control is obtained for the desired on-off operation of the laser at equally spaced or predetermined points along the scan line.

In one embodiment of the invention, the circuitry for providing clock signals at equal time intervals and making the selection from such clock signals, as indicated above, includes a stable clock, address counter, programmable memory circuit and a gating circuit. The output of the stable clock is connected to the address counter and to the gating circuit. The address counter responds to the output of the stable clock to address the programmable memory circuit which provides a serial output that is applied to a second input to the gating circuit. The gating circuit provides a logic 1 only when a logic 1 is present at both inputs of the gating circuit. The program entered in the programmable memory circuit determines when a logic 1 is presented at the gating circuit to select from the clock signals provided by the stable clock circuit. The program entered in the programmable memory takes into account the sinusoidal movement of the self-resonant mirror and the operational characteristics of the data clock producing means which receives the selected clock signals. Control of the VCO in response to the difference in count between the selected clock signals and the data clocking signals can be obtained by the use of an "up" counter and a "down" counter, with an adder circuit connected to receive the output of the two counters. The adder circuit determines the count difference and is connected to a digital to analog converter which converts the digital count difference into an analog control signal that is used to control the VCO.

BRIEF DESCRIPTION OF THE DRAWINGS

A better understanding of this invention, including its novel features and advantages, will be obtained upon consideration of the following detailed description and accompanying drawings wherein.

DETAILED DESCRIPTION

Figure 1:
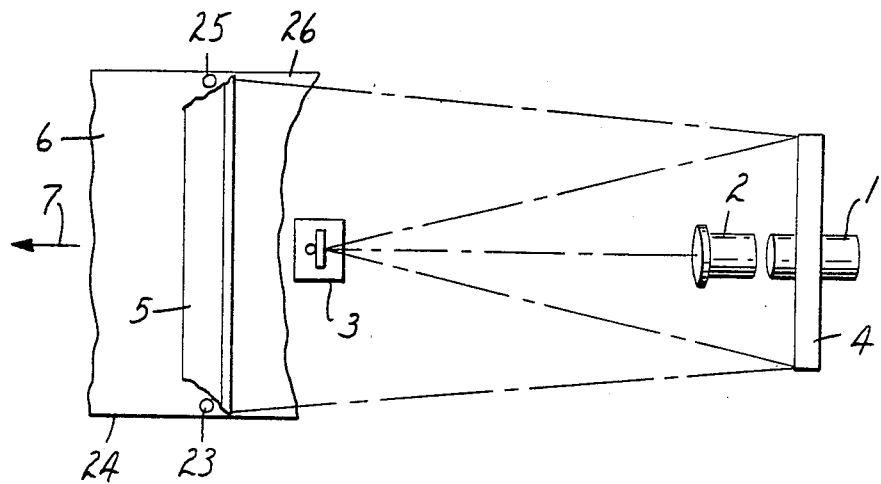
FIG. 1 is a plan view in schematic form illustrating the scanning portion of a laser printer apparatus.
Figure 2:
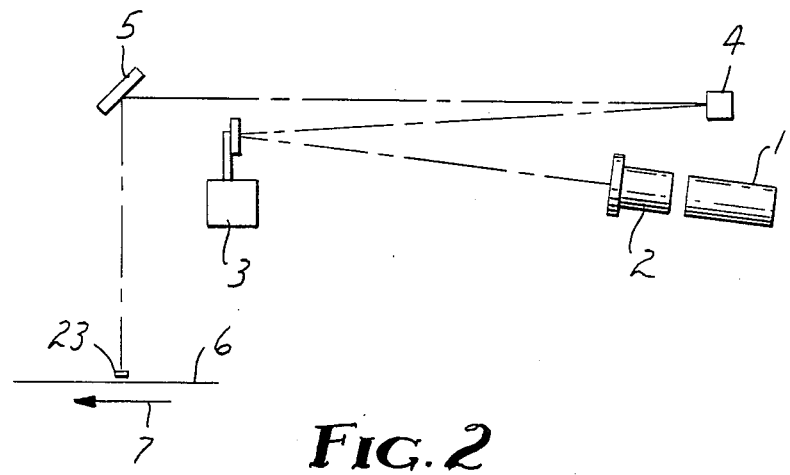
FIG. 2 is a side view of the scanning portion of a laser printer apparatus shown in FIG. 1.

Referring to FIG. 1 of the drawings, a plan view is shown illustrating the scanning portion of a laser printer 10 which includes a laser 1, which can be a laser diode type, a lens system 2, a self-resonant scanning mirror 3, mirrors 4 and 5 and a photoconductor element 6. Such elements are also shown in FIG. 2, which is a side view of the apparatus of FIG. 1. The photoconductor 6 is only partially shown. It is understood, however, that it can take the form of a belt, drum or flexible sheet.

Light from the laser 1 is focused by the lens system 2 onto the resonant scanning mirror 3 which oscillates to direct the light to mirror 4 causing the light to move as a scan lengthwise of mirror 4. The light presented to mirror 4 is reflected to mirror 5 which is positioned to direct such light to the photoconductor 6 to provide a line scan at the photoconductor 6. The photoconductor 6 is moved transversely of the light scan that is provided so a line-by-line scan is provided at the photoconductor 6. Movement of the photoconductor 6 is indicated by the arrow 7.

Apparatus of FIGS. 1 and 2 requires the laser 1 to be controlled for potential on or off operation at the same point in one scan line as in the preceding scan line. Failure to precisely control this action will cause the image produced at the photoconductor to present an irregular appearance and portions of an image intended to present vertical lines will not be exactly vertical. The solution to this problem is solved in part by the use of the resonant scanning mirror 3 since its movement is highly reproducible from one line scan to the next due to its high "Q". The velocity of the movement of the scanning mirror 3, however, is sinusoidal so the scan at each end portion of a scan line is carried out at a velocity that is less than the velocity during the center portion of a scan. The supply of image defining data signals to the laser 1, which determine the on-off condition for the laser, must be provided in a manner that takes into consideration the sinusoidal velocity of the scanning mirror 3 so that the on-off control of the laser 1 and, therefore, the image areas, are uniformly spaced or positioned at predetermined points in a scan line. Data clocking signal circuitry, as shown in FIG. 3, is provided by the present invention making it possible to provide the image defining data signals for on-off control of the laser 1 in the desired manner indicated above.

Figure 3:
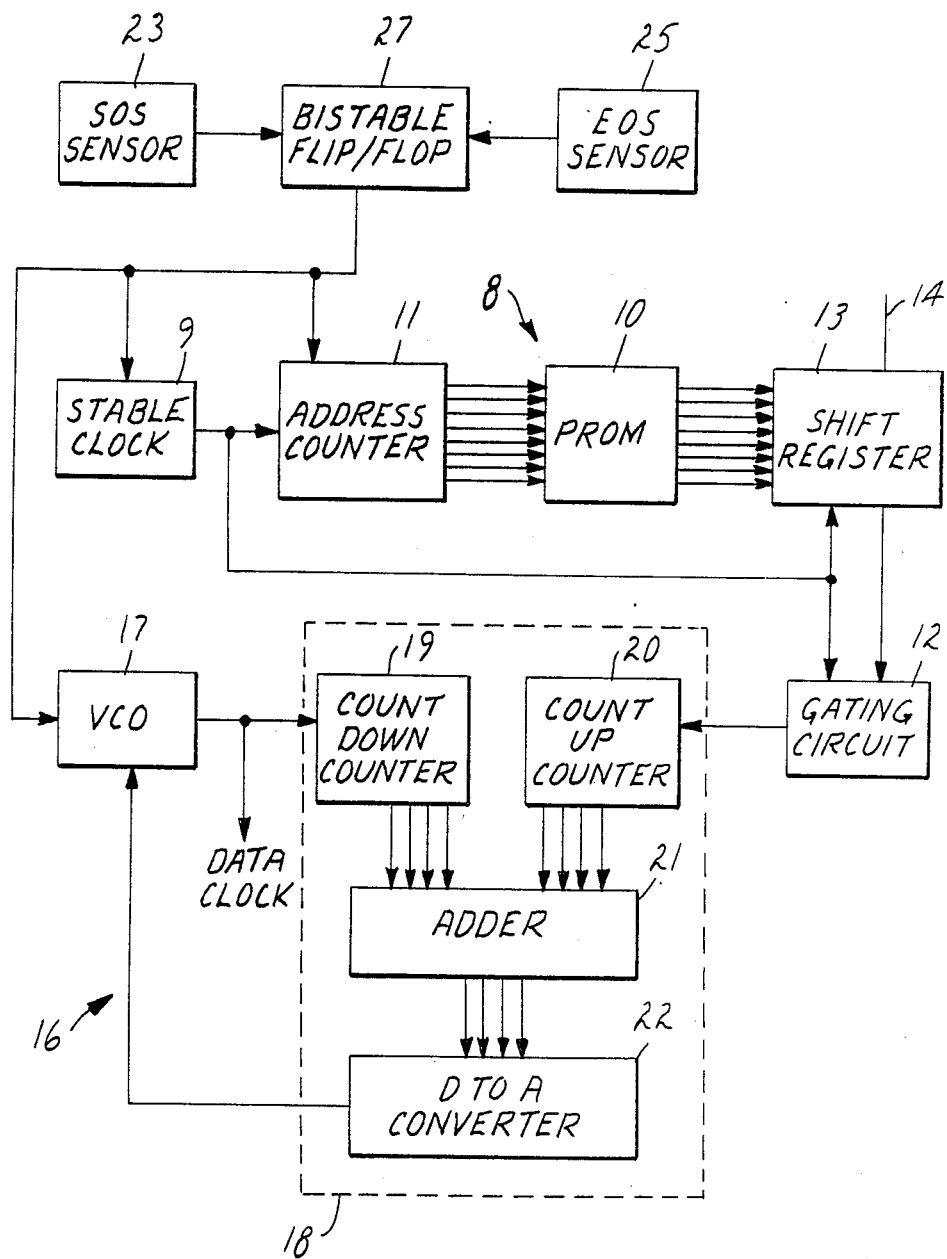
FIG. 3 is an electrical block diagram of clocking circuitry embodying the invention which is usable with the scanning portion of a laser printer as illustrated in FIGS. 1 and 2.

Referring to FIG. 3, the data clocking signal circuitry includes a clock signal producing portion or means 8 which provides clock signals that are equally spaced by equal time intervals and selects from such clock signals, clock signals that can be used for the production of data clock signals so that on-off operation of the laser 1 will occur when the laser 1 is directed via the self-resonant mirror 3 to predetermined points along a scan line. Except for special imaging applications, such predetermined points are equally spaced along the scan line and having a density equal to the resolution desired for the image in the direction of the line scan. Selection of the clock signals includes consideration of sinusoidal velocity of the self-resonant mirror plus the characteristics of the circuitry that uses the selected clock signals to produce data clock signals which serve to clock data signals that determine the on-off operation of the laser.

The clock signal producing portion 8 is provided by a stable clock 9 which provides the equal spaced clock signals with selection of the clock signals accomplished by the use of data stored in an addressable memory such as a programmable read only memory (PROM) 10. The selection data stored in the PROM 10 is addressed by an address counter 11 that is clocked by the output of the stable clock 9 and is applied to a gating circuit 12. The gating circuit 12 also receives the output of the stable clock 9. The gating circuit 12 provides a pulse when a pulse is provided from the stable clock 9 at the time a "1" is supplied from the PROM 10. Because of the PROM units currently available, the selection of a PROM 10 as the memory requires the use of a shift register 13 to provide parallel to serial transfer of data from the PROM 10. The shift register 13 is clocked by the output of the stable clock 9 and is cleared by a signal that is provided at 14 following the completion of a scan line.

If a stable clock 9 with a sufficiently high frequency is used, the intervals between the pulses from clock 9 can be such that the clock pulse selection would minimize the accumulated errors made in the selection. This would permit usage of the output from gate 9 as data clock signals. Such an approach requires an address counter 11 and PROM 10 that would have to operate at such high frequency making the circuitry more expensive.

The present invention avoids the above-mentioned cost problem by using a stable clock 9 that operates at a lesser frequency, for example 10.24 Mhz, and providing additional circuitry that simulates a phase locked loop to smooth out the intervals between the selected clock pulses. Unless this smoothing is provided, the reduced clock pulse selection that is possible at the lesser frequency causes line images made in one area of the scanned photoconductor to have a noticeable difference in width to the same image made in another area of the photoconductor.

The additional circuitry for providing the desired clock interval smoothing action is a data clock signal producing portion or means 16 that includes a voltage controlled oscillator (VCO) 17 and a control signal means 18 The VCO 17 has an output at which data clocking signals are provided. The control signal means 18 receives such data clocking signals from the VCO 17 as well as the selected clocking signals from gating circuit 12 to provide an output control signal that is based on the difference in accumulated count between the selected clock signals and the data clocking signals and is connected to the VCO 17 for control of its frequency of operation.

In the embodiment shown in FIG. 3, the control signal means 18 is provided by the use of a count down counter 19, a count up counter 20, an adder circuit 21 and a digital to analog converter 22. While FIG. 3 shows the counter 19 is connected to receive the data clock signals from the VCO 17 with counter 20 connected to receive the selected clock signals from the gating circuit 12, the position of counters 19 and 20 can be reversed. The output of the counters 19 and 20 is connected to the adder circuit 21 where the difference between the counts is determined and applied to the digital to analog converter 22 which produces an analog control signal based on the count difference provided by the adder circuit 21. This analog control signal is applied to the VCO 17 for control of its frequency.

It is apparent that a signal is required which serves to establish the position of the self-resonant mirror at a certain point during the start of a line scan relative to the surface to be scanned by the laser output so that the stable clock 9, the VCO 17 and address counter 11 will have reference points for initiating their operation. Similarly, a signal is needed that is indicative of the completion of a forward scan so that the operation of the stable clock 9, the VCO 17 and address counter 11 can be terminated. The manner in which such start of scan and end of scan signals are produced is not important except to the extent that the start of scan signal must be provided at the same point for each scan line. One convenient way for providing the start of scan line signal and the end of scan line signal is illustrated in FIG. 1. A light-to-electric transducer 23 is positioned just above and about 1.3 centimeters inside the start of line scan edge 24 of the photoconductor 6 and in line with the scan line so as to receive light from laser 1 via mirror 5 when light from laser 1 is provided as the scanning mirror 3 begins a writing or scanning movement. When light is thus provided to the light-to-electric transducer 23, a start of scan signal is produced. Similarly, a light-to-electric transducer 25 is positioned just above the photoconductor 6 and about 1.3 centimeters inside the end of line scan edge 26 of the photoconductor 6 and in line with the scan line so as to receive light from laser 1 via mirror 5 when light from laser 1 is provided as the scanning mirror 3 nears the end of a writing or scanning movement. When light is thus provided to the transducer 25, an end of scan line signal is produced. Return movement of the scanning mirror is not used as a writing or scanning movement so the laser 1 is arranged to be held off during such return movement by suitable circuitry (not shown). The light-to-electric transducers 23 and 25 can be photodetector devices which are readily available. A small photodetector is used, which with the sharp light beam from the laser 1, causes the end of scan line and start of scan line signals to precisely occur at the same point in one scan line to the next.

The signals provided by the start of scan sensor provided by the transducer 23 are applied to the set input of a bistable flip-flop circuit 27 which has its output applied to provide an enable signal to the stable clock 9, the address counter 11 and the VCO 17. The signals provided by the end of scan sensor provided by the transducer are applied to the reset input of the flip-flop circuit 27 causing the enable signal to be terminated.

The invention presented herein may be embodied in other specific forms without departing from the spirit or essential characteristics thereof. The embodiment that has been described is, therefore, considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. Data clocking circuitry for providing data clocking signals for use in the control of a laser to establish on-off operation of the laser with respect to a scan line defined by a scanning apparatus using a self-resonant mirror device to which the output of the laser is directed including:

a clock signal producing means for providing clock signals which are equally spaced by equal time intervals and selecting from such clock signals, clock signals that can be used for the production of data clocking signals so that on-off operation of the laser will occur when the laser is directed via the self-resonant mirror to predetermined points along a scan line;

data clocking signal producing means including a voltage controlled oscillator having an output at which data clocking signals are provided, and control signal means operatively connected to said voltage controlled oscillator for receiving said data clocking signals and to said clock signal producing means for receiving the selected clock signals, said control signal means providing an output control signal that is based on the difference in accumulated count between the selected clock signals and data clocking signals and is connected to said voltage controlled oscillator for control of said voltage control oscillator in accordance with said control signal.

2. Data clocking circuitry according to claim 1 wherein said clock signal producing means includes a stable clock for providing said clock signals, a memory for storing a program for controlling the selection of said clock signals that can be used for the production of data clocking signals, said memory operatively connected to said stable clock for addressing said memory; a gating circuit operatively connected to said stable clock and said memory for providing clock signals selected by said memory to said data clocking signal producing means.

3. Data clocking circuitry according to claim 1 wherein said control signal means includes a count up counter and a count down counter, one of said counters connected to the output of said voltage controlled oscillator to provide a count in response to the data clocking signals from said voltage controlled oscillator, the other of said counters connected to said clock signal producing means to provide a count in response to the clock signals selected by said clock signal producing means and means operatively connected to the output of each of said counters and to the voltage controlled oscillator for providing said output control signal for said voltage controlled oscillator.

4. Data clock circuitry according to claim 3 wherein said last-mentioned means includes an adder circuit connected to said count up counter and said count down counter for determining the difference in the accumulated count provided by each counter and a digital to analog converter connected to said adder for providing said output control signal based on the output of said adder circuit.

\* \* \* \* \*